United States Patent [19]
Schlie et al.

[11] Patent Number: 4,535,457
[45] Date of Patent: Aug. 13, 1985

[54] TRANSVERSE FLOW CW ATOMIC IODINE LASER SYSTEM

[75] Inventors: LaVerne A. Schlie; Robert D. Rathge, both of Albuquerque, N. Mex.

[73] Assignee: The United States of America as represented by the Secretary of the Air Force, Washington, D.C.

[21] Appl. No.: 593,759

[22] Filed: Mar. 27, 1984

[51] Int. Cl.$^3$ .............................................. H01S 3/22
[52] U.S. Cl. ...................................... 372/58; 372/59; 372/55; 372/72; 372/34
[58] Field of Search ...................... 372/55, 34, 58, 59, 372/72

[56] References Cited

U.S. PATENT DOCUMENTS

| | | | |
|---|---|---|---|
| 3,392,351 | 7/1968 | Tien | 331/94.5 |
| 3,509,486 | 4/1970 | Patel | 331/94.5 |
| 3,842,364 | 10/1974 | Srinivasan | 331/94.5 |
| 4,099,138 | 7/1978 | Jeffers et al. | 331/94.5 P |
| 4,126,833 | 11/1978 | Hundstad et al. | 331/94.5 PE |
| 4,210,877 | 7/1980 | Pleasance et al. | 331/94.5 PE |
| 4,287,483 | 9/1981 | Rudko et al. | 331/94.5 PE |
| 4,380,079 | 4/1983 | Cohn et al. | 372/87 |

OTHER PUBLICATIONS

Sze et al., "Mini-Lasers for High-Repetition-Rate Rare Gas Halide Oscillators"; *SPIE vol.* 190, *LASL Optics Conf.*, 1979, p. 305.

*Primary Examiner*—William L. Sikes
*Assistant Examiner*—Léon Scott, Jr.
*Attorney, Agent, or Firm*—Donald J. Singer; Stanton E. Collier

[57] ABSTRACT

A transverse flow CW atomic iodine laser system uses a closed cycle fuel system to operate in a continuous mode. An elliptical pump cell having a Hg arc lamp cooled by deionized water irradiates with UV energy $C_3F_7I$ gas to produce excited atomic iodine. A transverse flow section attached to the pump cell channels $C_3F_7I$ gas into a laser cell where lasing occurs. The flow section has upstream and downstream flow cavities, triangular shaped, that channel the laser gas. A diffuser and flow straighteners are placed in these cavities to make the flow velocity across the transverse laser axis as uniform as possible so as to produce very stable laser gain output.

10 Claims, 8 Drawing Figures

4,535,457

TRANSVERSE FLOW CW ATOMIC IODINE LASER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to halogen atomic lasers, and, in particular, to an atomic iodine laser excited by ultraviolet radiation.

In the past an open cycle gaseous fuel system was used on CW iodine lasers. Due to the loss of the expensive fuel and the buildup of $I_2$ in the lasing medium which caused quenching of the lasing, a closed cycle fuel system was used instead. The closed cycle fuel system was used on a longitudinal CW iodine probe laser, and although the closed cycle fuel system allowed continuous operation, the longitudinal iodine laser exhibited amplitude instability.

This instability, in particular, motivated a search for a CW iodine laser probe with greatly improved operating characteristics.

SUMMARY OF THE INVENTION

The present invention is directed toward a transverse CW atomic iodine laser system that minimizes amplitude instability and is able to operate in a continuous manner.

A closed cycle gaseous alkyl-iodide fuel fuel system provides a controllable flow of fuel. This fuel enters into a transverse flow section that is irradiated by ultraviolet radiation from an elliptical pump cell. The flow section has a gas diffuser and flow straighteners to ensure that there is uniform velocity across the shortened optical axis of the transverse laser.

One object of the present invention is to provide a transverse flow continuous wave atomic iodine laser.

Another object of the present invention is to provide a transverse flow section for a transverse flow CW atomic iodine laser that provides uniform flow velocity across the optical axis.

Another object of the present invention is a transverse flow section for a transverse flow CW atomic iodine laser that provides high amplitude stability.

These and many other objects and advantages of the present invention will be readily apparent to one skilled in the pertinent art from the following detailed description of a preferred embodiment of the invention and the related drawings

DETAILED DESCRIPTION OF THE PREFERRED EMBODIMENT

Figure 1:
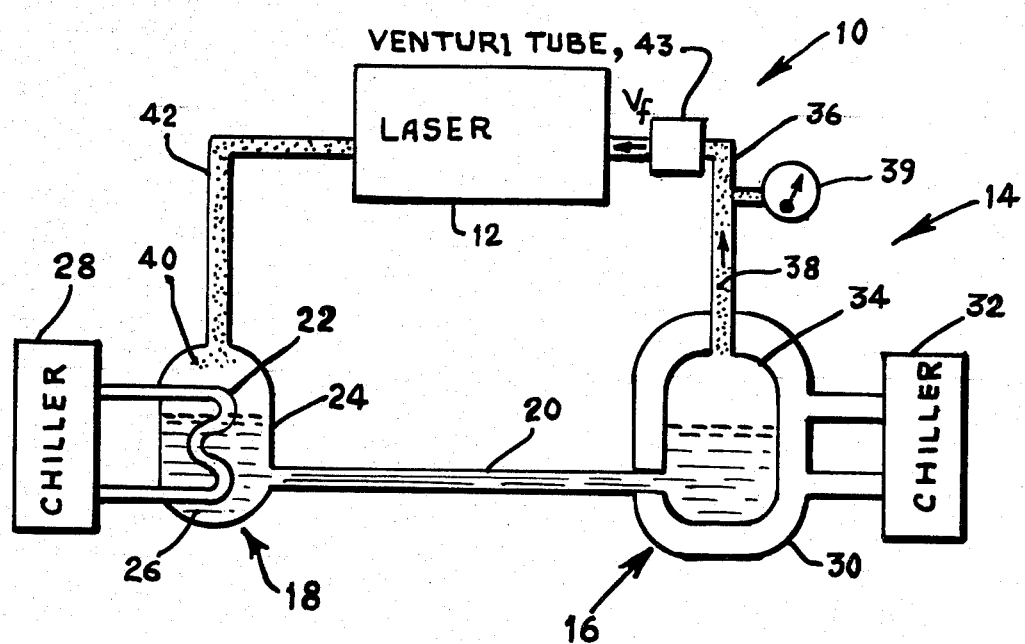
FIG. 1 shows by schematic view a closed cycle fuel fuel system for an iodine laser of the present invention.

Referring to FIG. 1, a closed cycle fuel system 14 is connected to a transverse CW iodine probe laser 12 to form a transverse CW iodine probe laser system 10.

Fuel system 14 has an evaporator 16 and a condenser 18 connected by a liquid exchange tube 20. A cooling coil 22 inside a condenser container 24 maintains a liquid $C_3F_7I$ 26 at a given temperature in the range from approximately $-40°$ to $-60°$ degrees centigrade. A chiller 28 circulates coolant through coil 22 for the above purpose. Evaporator 16 has a container 30 that is connected to a chiller 32. Coolant at a temperature above the condenser coolant temperature is circulated about an evaporator container 34 which is connected by tube 20 to allow liquid 26 to flow therebetween. As liquid $C_3F_7I$ 26 boils in evaporator container 34, a gas formed therein flows through an output evaporator tube 36 to probe laser 12. A pressure gauge 39, connected to output tube 36, allows a determination of a gas pressure therein. Lasing-by-products 40 pass into output tube 42 which allows gaseous $C_3F_7I$ and $I_2$ to be condensed into liquid 26 for reuse again.

In practice a liquid $C_3F_7I$ 26, about 200 grams, is placed into either condenser 18 or evaporator 16 to a height of approximately one centimeter above exchange tube 20.

Prior to putting liquid $C_3F_7I$ 26 into system 14, liquid 26 is poured through copper wool to remove any dissolved $I_2$. After liquid 26 is placed into system 14, system 14 is "degassed" by immersing it in liquid nitrogen (77° K.) and evacuated until a vacuum of one micron is achieved. This process removes any $O_2$ or $N_2$ dissolved in liquid 26. No process for $H_2O$ removal is necessary since it is frozen out in system 14 which is below 0° C. By having liquid 26 approximately one centimeter above tube 20, all gas 38 flows through tube 36, laser 12, and tube 42. At temperatures below 0° C., liquid $C_3F_7I$ 26 has a significant vapor pressure (e.g., at $-35°$, pressure about 20 torr and at $-5°$ C., vapor pressure is 114 torr). Consequently, any detrimental impurities like the photolytic or pyrolysis by-products $I_2$ and the dissolved $H_2O$ are frozen in the liquid $C_3F_7I$ 26 at condensation/evaporation cell temperatures below 0° C. The operating pressure is established by the cold point of system 14, namely condenser 18 temperature ($-40°$ to $-60°$ C). Between $-40°$ and $-78°$ C., the vapor pressure (torr) of n-$C_3F_7I$ is given by equation (1)

$$\log_{10} p(\text{torr}) = -\frac{1515.2}{T_C(°K.)} + 7.7138 \qquad (1)$$

where $T_c$ is condenser 18 temperature. The flow velocity $v_f$ as measured by a Venturi tube 43 is regulated by the temperature difference between condenser 18 and evaporator 14 baths and the orifices present in external tubes 36 and 42. For zero temperature differences, no flow is detected.

To measure the flow velocity of gaseous $C_3F_7I$ 38, Venturi tube 43 has an upstream and downstream diameter of 5 mm and at the throat a 4.2 mm diameter. The upstream end is tapered at approximately 20° while the downstream (diffuser) end is about 5°–7° to minimize any boundary layer problems. A MKS Baratron differential pressure unit Model 310 BH-100 is used to measure the difference between the upstream ($p_u$), throat ($p_t$), and downstream pressures ($P_d$). It was assumed that ideal incompressible flow conditions existed and since a negligible pressure drop ($P_u$-$P_d$) across Venturi tube 43 is observed (5% of total pressure), the flow velocity is determined using the Bernoulli equation and the conservation relationships and assuming $C_3F_7I$ acts as an ideal gas. As a test for Venturi tube 43 calibration, its flow velocity measurements were comparable with a known mass flow of the liquid $C_3F_7I$ 26.

Condenser 18 has helical cooling coil 22 inside to produce a large surface area for gaseous $C_3f_7I$ 38 to condense onto. Denatured alcohol (95%) cooled by a commercially available Neslab model ULT-80 refrigerated circulating bath, ($-40°$ to $-60°$ C.), flowed through helical coil 22. Evaporator 16 has outside container 30 which is kept typically at $-20°$ C. by flowing denatured alcohol cooled by either a Neslab refrigerated circulating bath Model LT-50 or RTE-8. Denatured alcohol is used for cooling because it has a much lower viscosity coefficient at temperatures below 0° C. than other coolants like ethylene glycol and water. The gas flow is from evaporator 16 to condenser 18; i.e., from the hot point to cold point in system 14. Flow velocities up to 60 m/sec at 20 torr of $C_3F_7I$ have been acquired. Reynold's numbers up to 100 have been obtained. One feature of closed cycle fuel fuel system 14 is its ease of operation and its unlimited continual operation.

The successful operation of an atomic iodine laser 12 is based on the photolysis of alkyl-iodides by ultraviolet radiation to produce the excited iodine atoms I* necessary for lasing. Such a process is described by

$$C_3F_7I + h_\nu \rightarrow C_3F_7 + I^* \qquad (2)$$

Figure 2A:
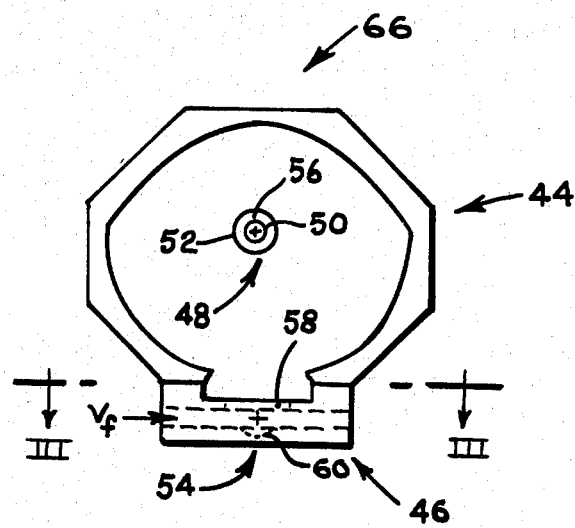
FIG. 2A illustrates an iodine laser of the present invention with an elliptical pump section and a transverse flow section.

Referring to FIG. 2A, an elliptical pump cell 44 provides the necessary ultraviolet radiation to a transverse flow section 46 attached to the bottom of pump cell 44. The untraviolet radiation is provided by an untraviolet (uv) source 48. Source 48 is preferably a Hg arc lamp 50 with a water cooling jacket 52. Lamp 50 is located at one focus of cell 44 and the other focus is positioned in a laser cell 54 wherein gas $C_3F_7I$ 38 flows. This arrangement optimumly transfers the ultraviolet (uv) radiation from Hg arc lamp 50 to laser gas $C_3F_7I$ 38 in laser cell 54. All surfaces of elliptical pump cell 44 were hand polished to enhance reflection from the inside of the aluminum ellipse. The internal width of pump cell 44 is 10 cm and the ellipse foci were at ±3.05 inches. The latus rectum (chord of ellipse through either focus that is perpendicular to the major axis of the ellipse) is 9.0 inches. To conserve space, a circular reflector, not shown, is centered on the upper focus 56 and in placed next to the latus rectum chord and apertured to allow the Hg arc radiation to be focused on a lower focus 58 of laser cell 54. Below laser cell 54, a half circle aluminum reflector 60 centered on laser axis 62 is placed to reflect back any uv radiation not absorbed by the n-$C_3F_7I$ laser gas 38. This is necessary since the absorption length $l(=1/N\sigma_p)$ is approximately 2.1 cm for $N=[C_3F_7I]=6\times10^{17}/cm^3$ and $\sigma_p=8\times10^{19}$ cm$^2$ at $\lambda\cong2700$ A. The longitudinal laser tube 64 diameter is 5 mm, shown in FIG. 2B, and thus only 21% ($=1-e^{-d/\theta}$) of radiation is absorbed per pass. UV pump source 48 is a 10 cm long high pressure Hg capillary d.c. arc lamp typically operating at one ampere and 2.6 KV.

The electronics necessary for running arc lamp 50 and for pumping coolant through water cooling jacket is not shown and is considered to be conventional. The lamp's quartz inside diameter (i.d.) and thicknesses were 1–3 mm and 1 mm respectively. Both Hg arc lamp 50 and elliptical pump cell 44 are water cooled (23° C.) to minimize any detrimental prolysis of the laser gas 38. The capillary Hg lamp 50 is enclosed in a water cooled quartz coaxial jacket 52 and deionized $H_2O$ is used since any metallic impurities in the $H_2O$ are photodissociated by Hg arc lamp's 50 uv radiation and subsequently deposited as an opaque coating on the outside of the lamp. Such coatings greatly reduce the photolytic pumping rate of gas $C_3F_7I$ 38 and usually terminate the lasing immediately.

To overcome this problem, the $H_2O$ bath cooling system output was run through a water deionizer prior to the laser's operation to assure that it had a resistivity of 18 megohms, the maximum possible value for $H_2O$. Water resistivities of 10 megohms or less resulted in metallic depositions on the lamp. While lamp 50 is operating, a water flow rate of 1.5 gallons/min at 23° C. was required to adequately cool the lamp. Such a flow was acquired by using a Neslab Cool Flow-75 refrigerant cooler. A d.c. power supply with large filtering capacitors (30 uf) and series inductor (10 henries) is used to stabilize the lamp's voltage and current. Utilizing these components with the d.c. power supply, less than 0.5% fluctuation was seen in each parameter.

System 10 operates at temperatures below (specifically the condenser and evaporater) 0° C. and evaporates and condenses gaseous $C_3F_7I$ 38. In addition, it provided unlimited operating time for cw atomic iodine laser probe by freezing into liquid $C_3F_7I$ 26 bath (condenser and evaporator sections), all the photolytic product $I_2$ produced by the reaction

$$I + I + RI \rightarrow I_2 + RI \qquad (3)$$

where RI represents the $C_3F_7$ laser fuel. This ability of the closed cycle system when coupled to this photolytic laser to freeze out all of the by-product $I_2$ into the liquid $C_3F_7I$ is the main reason unlimited cw lifetime operation is acquired.

When $I_2$ is present in the flow, the kinetic quenching process

$$I^* + I_2 \rightarrow I + I_2 \qquad (4)$$

prevents lasing. Because $I_2$ is readily formed as a by-product (reaction) in the photolysis of $C_3F_7I$ and its strong quenching prevents lasing, it is necessary to remove it from lasing medium 70 in laser cell 54. This is accomplished by a fast gas flow through laser cell 54. Experimentally, it was determined that a minimum flow velocity ($v_f$) of 1 meter/sec (measured with Venturi tube 43) is required for a 20 cm optical path length to sustain lasing. At flow velocities as high as 30 m/sec, lasing still occurs.

Figure 2B:
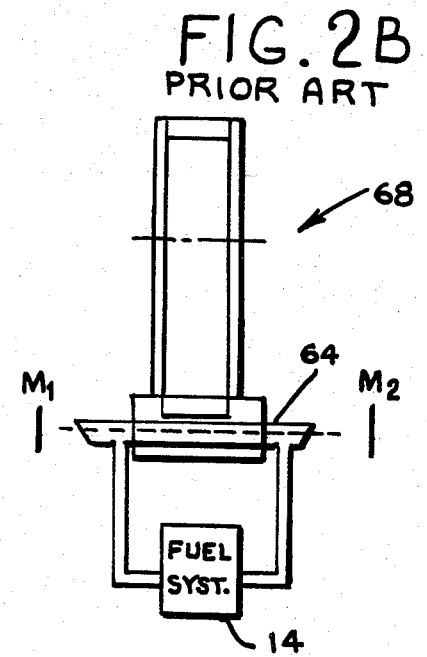
FIG. 2B illustrates a longitudinal flow laser.

The greatly improved performance of this transverse flow laser 66 shown in FIG. 2A relative to a longitudinal flow laser 68 shown in FIG. 2B is due to two critical issues: (a) a transverse flow lasing medium 70, FIG. 4, has greatly improved uniform gain along the optical axis; i.e., there exists no absorbing iodine ground state atoms along axis 62 as exists in the longitudinal flowing cw atomic iodine laser 68 and (b) the flow velocity of gaseous $C_3F_7I$ 38 is much more stable because of diffuser 72 and flow straighteners 74 in a transverse flow cavity 76, FIGS. 3 and 4.

Figure 6:
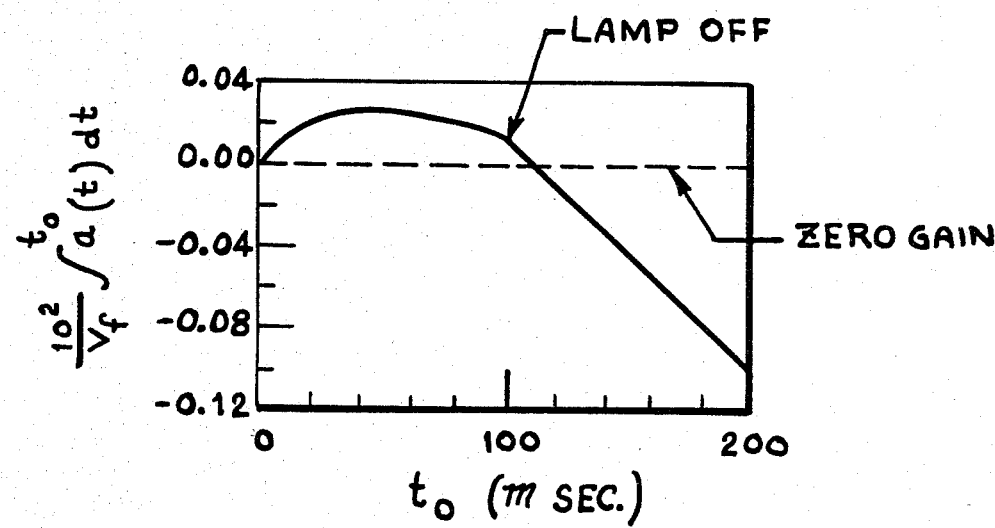
FIG. 6 demonstrates a theoretical curve of integrated gain along the optical axis as a function of the gas transit time.

FIG. 6 shows a theoretical prediction for the "normalized" integrated gain along optical laser axis 62 as a function of the gas transit time $t_o$. The gas transit time $t_o$ is given by $d/v_f$ where d is the flow distance (20 cm for the previously described longitudinal device and 0.5 cm for transverse laser 12) and $v_f$ represents the flow velocity of gas 38 through or across the lasing region. The total round trip pass gain is calculated by determining the transit time $t_o$ and then finding the corresponding "normalized" integrated gain $$1/v_f \int_0^{t_o} \alpha(t) \cdot dt$$

from FIG. 6. This parameter is then multiplied by $v_f$ and 2 to account for the round trip. If there exists any perturbations in the flow velocity, the integrated gain will correspondingly increase or decrease with this perturbation; i.e., move along the ordinate axis in FIG. 6. The resultant effect will be a fluctuation in the laser output and/or possible transverse mode switching.

Figure 3:
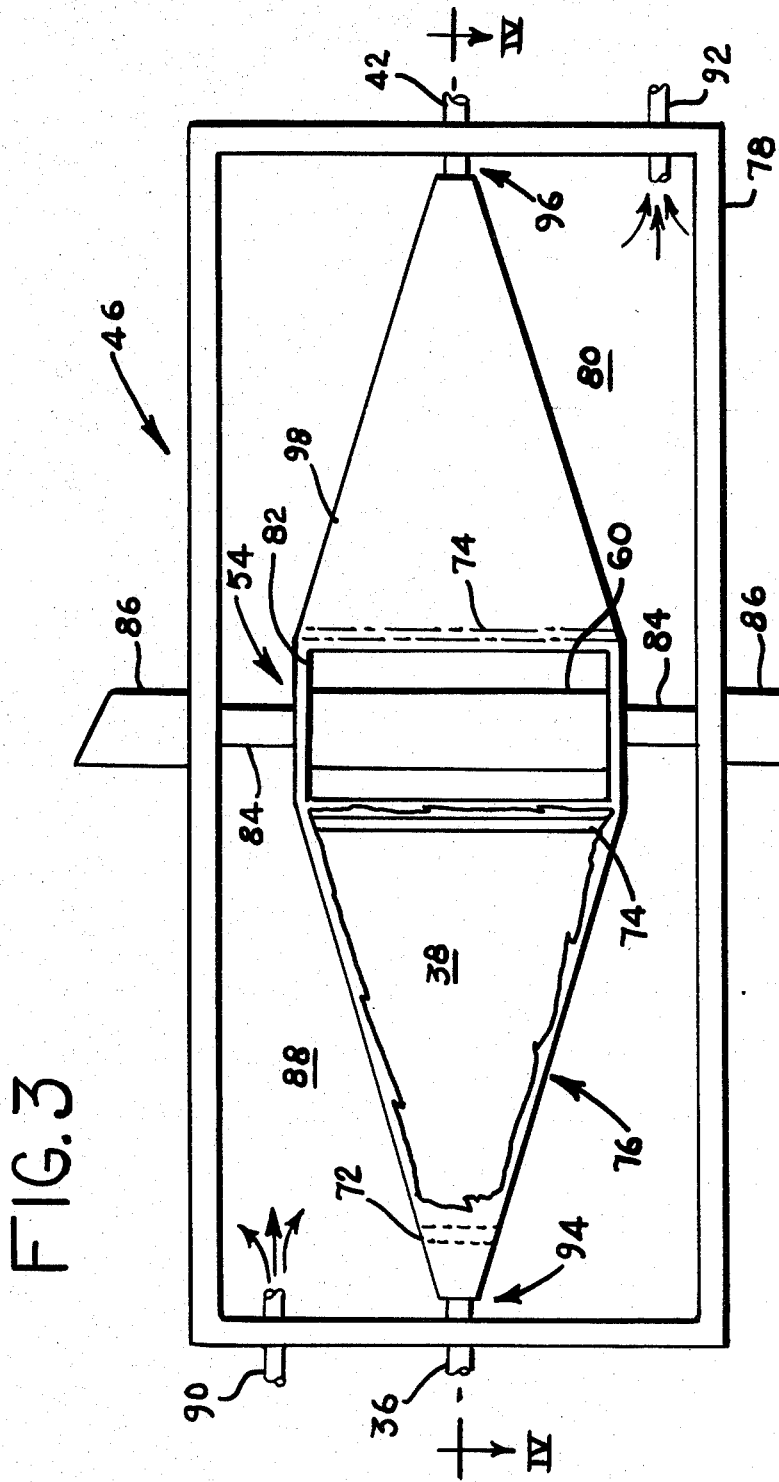
FIG. 3 is a partial cross section of a transverse flow section of the present invention shown in FIG. 2A taken along lines III—III.
Figure 4:
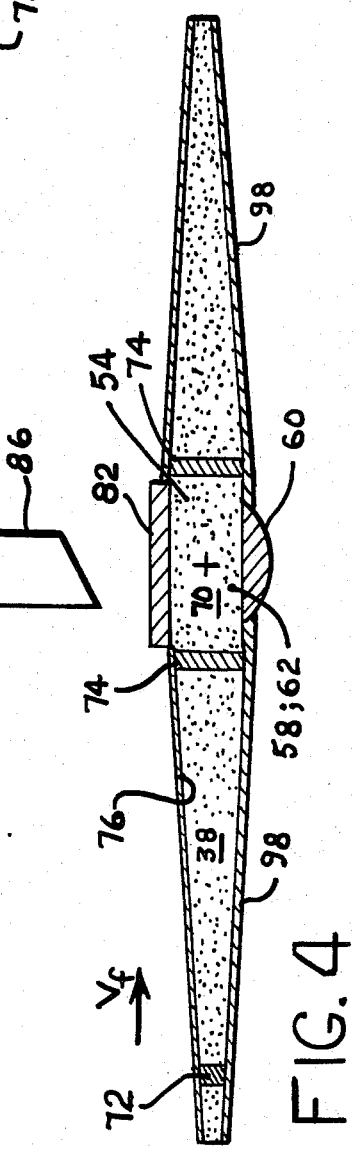
FIG. 4 is a partial vertical cross section of a transverse flow section of the present invention shown in FIG. 3 taken along lines IV—IV.

To overcome the downstream iodine absorptive process that affects gain stability, transverse flow cw atomic iodine laser 66 is preferred since the transit time $t_o$ is much more constant with the resultant effect of a much more stable laser output. FIGS. 3 and 4 show in greater detail a view and partial cross section of transverse flow section 46 of FIG. 2A, shown only diagrammatically.

The apparatus for transverse flow laser 66 is identical to longitudinal flow laser 68 except for transverse flow section 46.

Transverse flow section 46 is illustrated by a top view in FIG. 3 and by a partial cross section in FIG. 4. Referring to FIG. 3, a metal housing 78 made of aluminum, for example, is attached to pump cell 44 by conventional means such as by bolting. By design, housing 78 has an internal rectangular void 80 that is sealed from the external environment and is only able to communicate through a window 82 to pump cell 44. A coolant, not shown, is pumped into a void 88 surrounding flow cavity 76 and cell 54 through input 50 and output 92. Void 80 has mounted therein flow cavity 76 with laser cell 54 connected therein and positioned directly below window 82. As mentioned above, elliptical pump cell 44 has lower focus 58 which is also transverse laser axis 62, as shown in FIG. 4. UV radiation is further focused back onto laser axis 62 by cylindrical reflector 60. UV radiation in laser cell 54 interacts with lasing medium 70, and laser radiation is transmitted out of flow section 46 by means of tubes 84 attached to laser cell 54. Bragg windows 86 allow the laser radiation to pass to the external environment without loss.

Flow section 46 has an input port 94 and an exit port 96 at each end for connection to closed cycle $C_3F_7I$ fuel system 14. Symmetrically configured flow cavity 76 expands to a 10 cm width and a 5 mm height on both the upstream or downstream side of laser cell 54. Two centimeters on both sides of optical axis 62, laser cell 54 has a constant height (5 mm) and width (10 cm). Normal to the flow direction, parallel to the optical axis, and even with the top of the flow channel is placed a 5 cm × 25 cm quartz flat (0.95 cm thick) for window 82 for transmitting the uv photolysis radiation to transversely flowing $C_3F_7I$ gas 38. Hg arc lamp 50, upper focus 56, and optical axis 62, lower focus 58, are at the foci of elliptal pump cell 44. The vacuum integrity of quartz window 82 is made by using a configuration in which quartz window 82 is sealed with a chemically curing silicone rubber flexible sealant to cavity walls 98. Below optical axis 62 even with the bottom of the flow channel is placed 10 cm long quartz cylindrical lens reflector 60 having a focus on optical axis 62 and aluminized on the curved side to reflect any uv radiation not absorbed by gas $C_3F_7I$ 38 back toward optical axis 62. Like elliptical pump cell 44, transverse flow section 46 is $H_2O$ cooled to minimize any pyrolysis effects on $C_3F_7I$ laser gas 38. The interaction of uv radiation with laser gas 38 in laser cell 54 creates lasing in medium 70 in laser cell 54.

For flow uniformity, diffuser 72 is placed upstream next to input port 94 coupling. Diffuser 72 is made from an open cell aluminum foam having approximately 20 pores/inch and a density 6% of solid aluminum. Diffuser 72 serves to spread the flow across the channel and eliminate turbulence created by input port 94.

At approximately 2 cm upstream to optical axis 62 in the straight flow section is placed another piece of aluminum foam. Its purpose is to straighten the flowing $C_3F_7I$ gas 38 streamlines across lasing medium 70. Diffuser 72 and flow straighteners 74 reduce any fluctuations in the flow velocity and consequently the integrated gain shown in FIG. 6 is constant; i.e., the transit time $t_o$ is constant. This is the dominant reason a much more stable laser output is achieved in transverse flow cw atomic iodine laser system 10 as compared to a longitudinal flow laser. Further, two flow straighteners 72 on both sides of optical axis 62 prevent any UV radiation from propagating upstream. This restriction is very important since such UV radiation produces I*/I atoms which can subsequently form the photolylic byproduce $I_2$ that strongly quenches excited iodine I* and also creates a loss of $C_3F_7I$. For similar reasoning, an aluminum foam was also placed approximately 2 cm downstream to optical axis 62. These pieces of aluminum also greatly reduced any flow instabilities. Utilizing these flow straighteners 74 2 cm either side of the optical axis 62 greatly reduced the production of $I_2$ as observed in the evaporator/condenser sections of the closed cycle laser fuel system 14.

Figure 5A:
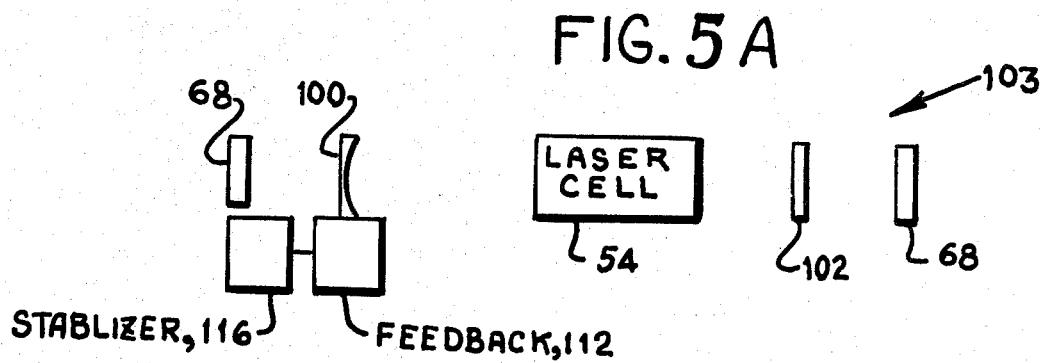
FIGS. 5A and 5B illustrate various resonators used on the transverse CW atomic iodine laser of the present invention.
Figure 5B:
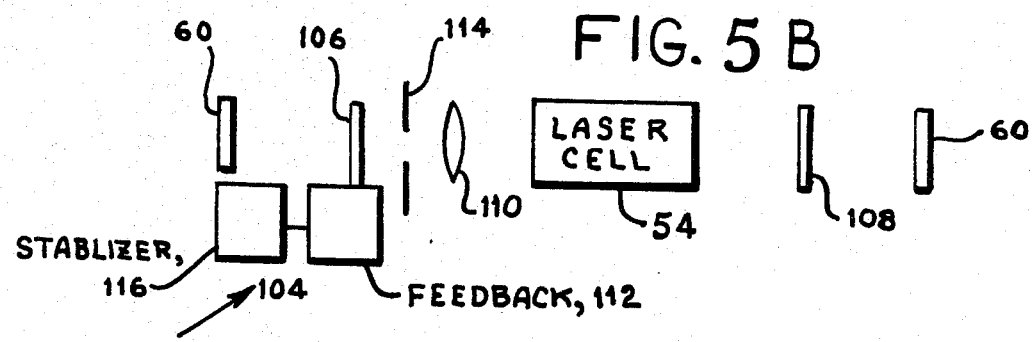

Brewster quartz windows 86 having a λ/10 optical surface quality and 5 mm diameter apertures were mounted to tubes 84. These windows were at first purged with a small flow of $C_3F_7I$ to remove any stagnant gas, but later, it was observed that such flow was unnecessary. Different types of resonators were used, reference FIGS. 5A and 5B. Typically, in a resonator 103 a 10 meter, 99.9% reflector 100 at 1.315 was used with a flat 102 having output couplings of 1 to 5%. Also, a resonator 104 consisting of two flats 106 and 108 (one with different output coupling) and an internal lens 110 having a anti-reflection coating at 1.315 microns and a spherical surface figure better than λ/10 is used. Resonator 104 expands the beam size in the gain region while oscillating in only the TEM$_{00}$ fundamental transverse mode. To assure lasing on the line center, a Lasing Model 80.214 active resonator feedback system 112 using a piezoelectric crystal (PZT) as one mirror mount is employed as shown in FIGS. 5A and 5B.

The transverse probe laser system 10 lases very easily when the operating pressure of $C_3F_7I$ was between 12 to 25 torr and the d.c. Hg arc lamp power was approximately 3 kV at one ampere. The threshold flow velocity was 1 meter/sec through the 5 mm i.d. Venturi tube 43 or 0.4 cm/sec through the 0.5 cm×10 cm straight flow channel. Typical power outputs of 5 mw have been observed. Without any internal apertures, the laser output oscillated in various transverse modes up to $TEM_{44}$. Using an internal iris 114, shown in FIG. 5B, stable operation on only the $TEM_{00}$ transverse mode is obtained. As expected, this operation significantly reduced the available laser output power. Maximum continual lasing times have been tested up to seven hours with very reliable operation.

Oscillation on the strongest $F'=3$ to $F''=4$ iodine hyperfine transition existed as detected by a Fabry-Perot interferometer. Further examaination showed that only one longitudinal mode oscillated in the $F'=3$ to $F''=4$ hyperfine transition. A PZT crystal drive was placed behind one mirror to frequency stabilize the laser on the peak of the gain profile and to also scan the gain profile. When a lock-in stabilizer 116 is used with the PZT crystal, very good amplitude stability was obtained.

Clearly, many modifications and variations of the present invention are possible in light of the above teachings and it is therefore understood, that within the inventive scope of the inventive concept, the invention may be practiced otherwise than specifically claimed.

What is claimed is:

1. A transverse flow CW atomic iodine laser system, said system comprising:
   means for providing ultraviolet radiation to a lasing gas medium to produce excited atomic iodine,
   a closed cycle fuel system, said fuel system providing a continuous flow of a laser gas to form said lasing gas medium when said ultraviolet radiation interacts with said laser gas, said fuel system having a condenser for liquifying said laser gas after lasing to form a liquid fuel, said condenser outputting said liquid fuel to an evaporator, said evaporator providing said laser gas for lasing at a predetermined velocity, said velocity being regulated by a temperature difference of said liquid fuel in said condenser and said evaporator and by laser gas flow orifices in said fuel system, whereby said closed cycle fuel system operates without loss of said liquid fuel condenser, said evaporator and said condenser connected together such that a liquid fuel is transferred to said evaporator, said evaporator providing said laser gas at a predetermined velocity,
   a transverse laser flow section, said flow section attached to said means for providing ultraviolet radiation and to said closed cycle fuel system, said flow section comprising: a housing, a transverse flow cavity, and said laser cell, said housing having a void therein, said housing having a coolant input port and output port for allowing said coolant to circulate about said transverse flow cavity and about said laser cell positioned within said void, said housing having a laser gas input port and output port for allowing said laser gas to flow into and out of said transverse flow cavity, and said housing having laser beam output ports, said transverse flow cavity having an upstream and a downstream flow cavity, said flow cavities being surrounded by walls to confine the flow of laser gas therein, said upstream flow cavity having therein a flow diffuser and a flow straightener, said downstream flow cavity having therein a flow straightner, said laser cell being attached between said upstream and said downstream flow cavities, and said laser cell having a window for allowing said ultraviolet radiation to enter said cell to pump said laser gas, a radiation reflector for reflecting ultraviolet radiation back onto a transverse laser axis within said laser cell, and a void therein for said lasing gas medium, and
   a laser resonator connected to said laser cell to receive and output laser radiation.

2. A transverse flow CW atomic laser as defined in claim 1 wherein said means for providing ultraviolet radiation includes an elliptical pump cell, said pump cell having a Hg arc lamp positioned on the upper focus of said elliptical pump cell, said arc lamp being cooled by deionized water flowing through a cooling jacket about said arc lamp, the lower focus of said elliptical pump cell being congruent with said laser axis in said laser cell, said ultraviolet radiation from said arc lamp entering said laser cell through said window.

3. A transverse flow CW atomic iodine laser system as defined in claim 1 wherein said liquid fuel of said closed cycle fuel system is $C_3F_7I$.

4. A transverse flow CW atomic iodine laser system as defined in claim 1 wherein said closed cycle fuel system produces a laser gas velocity in the range of from about 0.1 meters per second to about 60 meters per second.

5. A transverse flow CW atomic iodine laser system as defined in claim 1 wherein said upstream and said downstream flow cavities are substantially triangular shaped.

6. A transverse flow CW atomic iodine laser system as defined in claim 5 wherein said cavities have an opening of about 10 centimeters width by about 5 millimeters height adjacent to said laser cell.

7. A transverse flow CW atomic iodine laser system as defined in claim 1 wherein said diffuser and said flow straighteners are composed of open cell aluminum foam having approximately 20 pores per inch and a density of 6% of solid aluminum.

8. A transverse flow CW atomic iodine laser system as defined in claim 1 wherein said flow straighteners are placed closely adjacent to said laser cell.

9. A transverse flow CW atomic iodine laser system as defined in claim 1 wherein said laser resonator includes a curved mirror mounted on a feedback and stablizer system to assure lasing on a center line and a flat mirror having a low output coupling.

10. A transverse flow CW atomic iodine laser system as defined in claim 1 wherein said laser resonator includes a flat mirror mounted on a feedback and stabilizer system to assure lasing on a center line, an internal aperture to limit high order modes of lasing, a lens to expand a lasing beam size, and a flat mirror having a low output coupling.

* * * * *